(12) United States Patent
Nakamichi

(10) Patent No.: US 11,198,330 B2
(45) Date of Patent: Dec. 14, 2021

(54) TIRE

(71) Applicant: SUMITOMO RUBBER INDUSTRIES, LTD., Kobe (JP)

(72) Inventor: Teppei Nakamichi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 293 days.

(21) Appl. No.: 15/953,033

(22) Filed: Apr. 13, 2018

(65) Prior Publication Data
US 2018/0297413 A1    Oct. 18, 2018

(30) Foreign Application Priority Data
Apr. 14, 2017    (JP) .............................. JP2017-080632

(51) Int. Cl.
*B60C 11/03*    (2006.01)
*B60C 11/12*    (2006.01)
*B60C 11/13*    (2006.01)

(52) U.S. Cl.
CPC ...... *B60C 11/0302* (2013.01); *B60C 11/0304* (2013.01); *B60C 11/0306* (2013.01);
(Continued)

(58) Field of Classification Search
CPC ............ B60C 11/0302; B60C 11/1307; B60C 11/1236; B60C 2011/1209; B60C 2011/0358
See application file for complete search history.

(56) References Cited

U.S. PATENT DOCUMENTS

| 2007/0000590 A1* | 1/2007 | Murata .................. B60C 11/13 152/209.8 |
| 2013/0160909 A1* | 6/2013 | Atake ................. B60C 11/0309 152/209.25 |

(Continued)

FOREIGN PATENT DOCUMENTS

| EP | 1541381 A1 | 6/2005 |
| EP | 2738019 A1 | 6/2014 |

(Continued)

OTHER PUBLICATIONS

Extended European Search Report, dated Jul. 16, 2018, for European Application No. 18166625.6.

*Primary Examiner* — Timothy Kennedy
*Assistant Examiner* — Olukorede Esan
(74) *Attorney, Agent, or Firm* — Birch, Stewart, Kolasch & Birch, LLP

(57) ABSTRACT

A tire includes a tread portion being divided into four land portions by one circumferentially extending crown main groove and two circumferentially extending shoulder main grooves arranged one on each side of the crown main groove. The four land portions include two crown land portions disposed one on each side of the crown main groove. Each of the crown land portions is provided with first crown lateral grooves each extending from the crown main groove and terminating within the crown land portion and second crown lateral grooves each extending from the adjacent shoulder main groove and terminating within the crown land portion. In each of the crown land portion, the first crown lateral grooves and the second crown lateral grooves extend at least to an axial center location of the crown land portions.

16 Claims, 11 Drawing Sheets

(52) U.S. Cl.
CPC ...... *B60C 11/1236* (2013.01); *B60C 11/1259* (2013.01); *B60C 11/1307* (2013.01); *B60C 11/1263* (2013.01); *B60C 2011/039* (2013.01); *B60C 2011/0344* (2013.01); *B60C 2011/0358* (2013.01); *B60C 2011/0365* (2013.01); *B60C 2011/0367* (2013.01); *B60C 2011/0386* (2013.01); *B60C 2011/1209* (2013.01)

(56) References Cited

U.S. PATENT DOCUMENTS

| | | | | |
|---|---|---|---|---|
| 2013/0167995 | A1* | 7/2013 | Hada | B60C 11/1369 152/209.9 |
| 2014/0090759 | A1* | 4/2014 | Tanaka | B60C 11/0306 152/209.8 |
| 2014/0090760 | A1 | 4/2014 | Matrascia et al. | |
| 2014/0150941 | A1* | 6/2014 | Takei | B60C 11/04 152/209.8 |
| 2014/0283967 | A1* | 9/2014 | Inoue | B60C 11/0306 152/209.18 |
| 2015/0151584 | A1* | 6/2015 | Koishikawa | B60C 11/13 152/209.18 |
| 2015/0202928 | A1* | 7/2015 | Akashi | B60C 11/0306 152/209.25 |
| 2015/0251500 | A1* | 9/2015 | Pokutta-Paskaleva | B60C 11/1236 152/209.25 |
| 2015/0352905 | A1* | 12/2015 | Tanaka | B60C 11/1272 152/209.18 |
| 2017/0305199 | A1 | 10/2017 | Hatanaka et al. | |

FOREIGN PATENT DOCUMENTS

| | | |
|---|---|---|
| EP | 2781374 A2 | 9/2014 |
| EP | 3118025 A1 | 1/2017 |
| JP | 2013-35449 A | 2/2013 |
| JP | 2016-150601 A | 8/2016 |
| WO | WO 2016/056168 A1 | 4/2016 |

* cited by examiner

TIRE

BACKGROUND ART

Field of the Invention

The present disclosure relates to tires, and more particularly to a tire capable of improving snow performance while maintaining steering stability on dry roads.

Description of the Related Art

Tires with tread portions which have a designated mounting direction to a vehicle and which are divided into two shoulder land portions and two crown land portions, i.e., so-called four-rib tires, have been proposed. Each land portions of such tires as mentioned above tends to have a large width and high rigidity. Thus, the four-rib tires may be expected to exert an excellent steering stability on dry roads.

Even the four-rib tires are required to exert minimum snow performance when driving on snow roads. Generally, in order to improve snow performance, it may be believed to provide lateral grooves on the crown land portions. Unfortunately, when lateral grooves which traverse completely the crown land portions are provided on the crown land portions, the crown land portions may be reduced in rigidity, resulting in deteriorating steering stability on dry roads which is to be expected as an advantage of the four-rib tires.

SUMMARY OF THE DISCLOSURE

In view of the above problems in the conventional art, the present disclosure has an object to provide four-rib tires capable of improving snow performance while maintaining steering stability on dry roads.

According to one aspect of the disclosure, a tire includes a tread portion being divided into four land portions by one circumferentially extending crown main groove and two circumferentially extending shoulder main grooves arranged one on each side of the crown main groove. The four land portions include two crown land portions disposed one on each side of the crown main groove. Each of the crown land portions is provided with first crown lateral grooves each extending from the crown main groove and terminating within the crown land portion and second crown lateral grooves each extending from the adjacent shoulder main groove and terminating within the crown land portion. In each of the crown land portion, the first crown lateral grooves and the second crown lateral grooves extend at least to an axial center location of the crown land portions.

In another aspect of the disclosure, the tread portion may have a designated mounting direction to a vehicle to define an outboard tread edge to be located on an outboard of a vehicle when the tire is mounted to the vehicle and an inboard tread edge to be located on an inboard of the vehicle when the tire is mounted to the vehicle, and in the crown land portion located on a side of the inboard tread edge, the first crown lateral grooves and the second crown lateral grooves may extend beyond the axial center location of the crown land portion.

In another aspect of the disclosure, in the crown land portion located on a side of the outboard tread edge, the second crown lateral grooves may have larger axial lengths than the first crown lateral grooves.

In another aspect of the disclosure, the crown land portion located on a side of the outboard tread edge may be provided with semi-opened sipes each extending from the crown main groove toward the outboard tread edge and terminating within the crown land portion.

In another aspect of the disclosure, the crown land portion located on the side of the inboard tread edge may be provided with full-opened sipes each completely traversing the crown land portion.

In another aspect of the disclosure, at least one of the crown land portions may be provided with a circumferentially extending crown longitudinal sipe.

In another aspect of the disclosure, the tread portion may have a designated mounting direction to a vehicle to define an outboard tread edge to be located on an outboard of a vehicle when the tire is mounted to the vehicle and an inboard tread edge to be located on an inboard of the vehicle when the tire is mounted to the vehicle, and the four land portions may include an outboard shoulder land portion disposed axially outside the crown land portions on a side of the outboard tread edge and an inboard shoulder land portion disposed axially outside the crown land portions on a side of the inboard tread edge.

The inboard shoulder land portion may be provided with inboard shoulder lateral grooves each connecting the inboard tread edge and one of the shoulder main grooves adjacent to the inboard shoulder land portion.

In another aspect of the disclosure, the outboard shoulder land portion may be provided with outboard shoulder lateral grooves each extending axially inwardly from the outboard tread edge and terminating within the outboard shoulder land portion.

In another aspect of the disclosure, the outboard shoulder land portion or the inboard shoulder land portion may be provided with a circumferentially extending shoulder longitudinal sipe.

DESCRIPTION OF THE PREFERRED EMBODIMENTS

Figure 1:
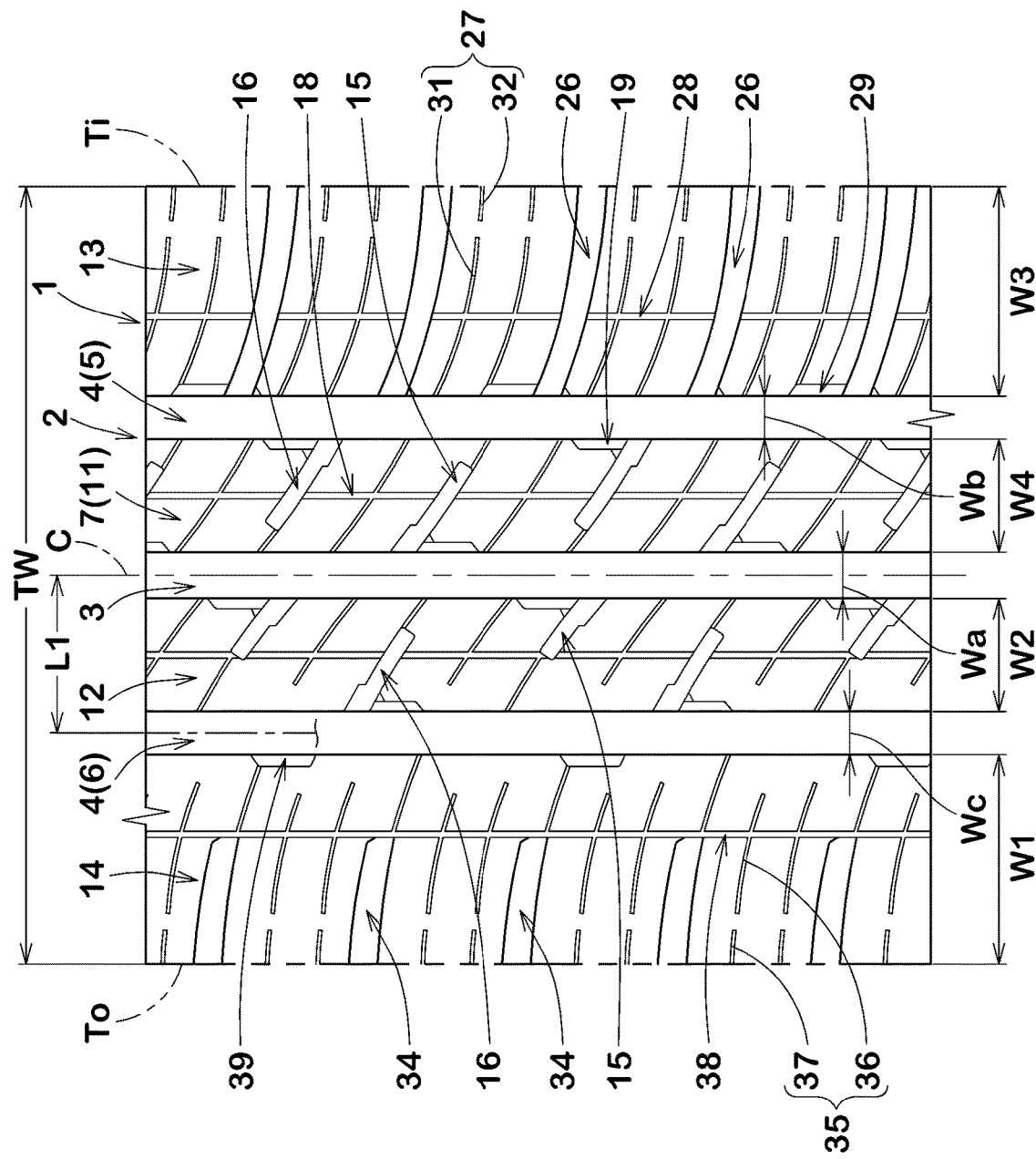
FIG. 1 is a development view of a tread portion of a tire in accordance with an embodiment of the present disclosure.

An embodiment of the present invention will be explained below with reference to the accompanying drawings. FIG. 1 illustrates a development view of a tread portion 2 of a tire 1 in accordance with an embodiment of the present disclosure. The tire 1 in accordance with the present embodiment, for example, is used for various types of tires such as pneumatic tires for passenger car and/or heavy-duty vehicle as well as non-pneumatic tires which can support the tire load structurally without being filled with a pressurized air. The tire 1 in accordance with the present embodiment, for example, is suitably used for a pneumatic tire for passenger car.

As illustrates in FIG. 1, in this embodiment, the tread portion 2 has a designated mounting direction to a vehicle to define an outboard tread edge To to be located on an outboard of a vehicle when the tire 1 is mounted to the vehicle and an inboard tread edge Ti to be located on an inboard of the vehicle when the tire 1 is mounted to the vehicle. The mounting direction to a vehicle, for example, may be indicated on a sidewall portion (not illustrated) using letters or marks.

As used herein, in the case of a pneumatic tire, the tread edges To and Ti refer to axially outermost edges of the ground contacting patch of the tread portion 2 which occurs under a normally inflated loaded condition when the camber angle of the tire is zero.

As used herein, the normally inflated loaded condition is such that the tire 1 is mounted on a standard wheel rim (not illustrated) and inflated to a standard pressure and loaded with a standard tire load.

As used herein, a normal condition of the tire 1 is such that the tire 1 is mounted on the standard wheel rim and inflated to the standard pressure but loaded with no tire load. In this application including specification and claims, various dimensions, positions and the like of the tire 1 refer to those under the normal condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In this embodiment, the tread portion 2, for example, is provided with one circumferentially and continuously extending crown main groove 3 and two circumferentially and continuously extending shoulder main grooves 4. In this embodiment, the crown main groove 3, for example, is provided on the tire equator C. The shoulder main grooves 4 are arranged one on each side of the crown main groove 3. The shoulder main grooves 4, for example, include: an inboard shoulder main groove 5 arranged between the tire equator C and the inboard tread edge Ti; and an outboard shoulder main groove 6 arranged between the tire equator C and the outboard tread edge To. In some preferred embodiments, each of the main grooves 3 and 4 extends in a straight manner in the tire circumferential direction.

Preferably, each of the shoulder main grooves 4, for example, is arranged such that the groove centerline thereof is located at an axial distance L1 of from 0.15 to 0.25 times the tread width TW from the tire equator C. As used herein, the tread width TW is an axial distance from the inboard tread edge Ti to the outboard tread edge To under the normal condition of the tire 1.

Preferably, the crown main groove 3, the inboard shoulder main groove 5 and the outboard shoulder main groove 6, for example, respectively have groove widths Wa, Wb and Wc in a range of from 3.0% to 5.0% of the tread width TW. Preferably, the crown main groove 3, the inboard shoulder main groove 5 and the outboard shoulder main groove 6, in case of a passenger car tire, have groove depths of from 5 to 10 mm. Thus, wet performance and steering stability may be improved in a well-balanced manner.

The tread portion 2 is divided into four land portions by the crown main groove 3 and two shoulder main grooves 5 and 6. The land portions includes two crown land portions 7 disposed one on each side of the crown main groove 3. The crown land portions 7 include one crown land portion (hereinafter, it may be referred to as an "inboard crown land portion") 11 disposed on a side of the inboard tread edge Ti with respect to the crown main groove 3 and the other one crown land portion (hereinafter, it may be referred to as an "outboard crown land portion") 12 disposed on a side of the outboard tread edge To with respect to the crown main groove 3.

The tread portion 2 further includes an outboard shoulder land portion 14 disposed axially outside the crown land portions 7 on a side of the outboard tread edge To and an inboard shoulder land portion 13 disposed axially outside the crown land portions 7 on a side of the inboard tread edge Ti.

In some preferred embodiments, the outboard shoulder land portion 14 has an axial width W1 which is in a range of from 1.0 to 2.0 times an axial width W2 of the outboard crown land portion 12, i.e. the ratio W1/W2 being of from 1.0 to 2.0. Similarly, the inboard shoulder land portion 13 has an axial width W3 which is in a range of from 1.0 to 2.0 times an axial width W4 of the inboard crown land portion 11, i.e. the ratio W3/W4 being of from 1.0 to 2.0. Thus, rigidity balance of the land portions is optimized, leading to better steering stability on dry roads.

Figure 2:
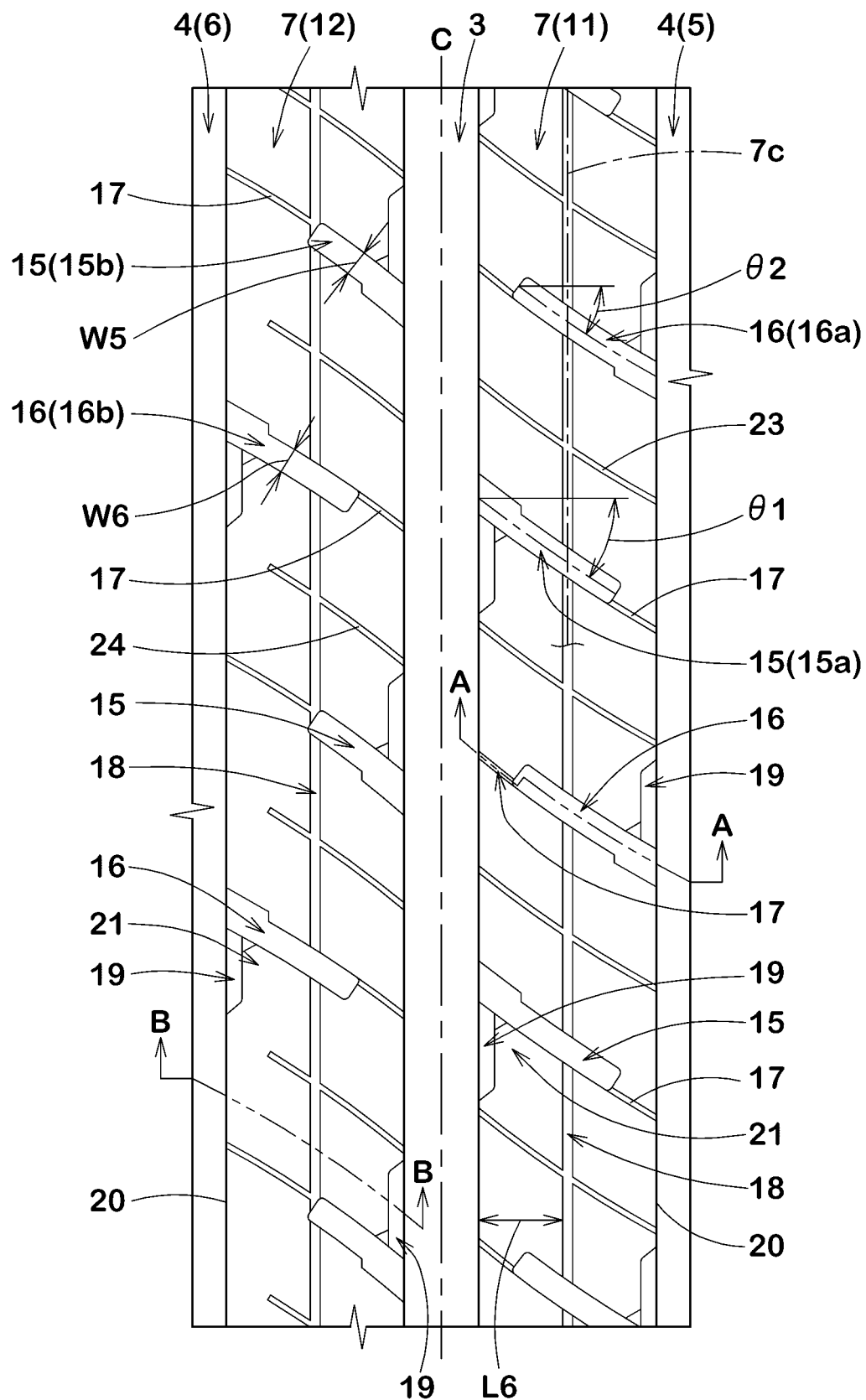
FIG. 2 is a partial enlarged view of FIG. 1 for illustrating two crown land portions.

FIG. 2 illustrates an enlarged view of the inboard crown land portion 11 and the outboard crown land portion 12. As illustrated in FIG. 2, each of the crown land portions 11 and 12 is provided with first crown lateral grooves 15 and second crown lateral grooves 16. In each of the crown land portions 11 and 12, the first crown lateral grooves 15 each extend from the crown main groove 3 and terminate within the crown land portion 7. In each of the crown land portions 11 and 12, the second crown lateral grooves 16 each extend from the adjacent shoulder main groove 4 and terminate within the crown land portion 7.

Since the first crown lateral grooves 15 and the second crown lateral grooves 16 terminate within the crown land portions, excessive reduction in rigidity of the crown land portions can be suppressed, resulting in maintaining sufficient steering stability on dry roads.

The first crown lateral grooves 15 and the second crown lateral grooves 16 extend at least to an axial center location 7c of each of the crown land portions 7. Thus, sufficient lengths of the first crown lateral grooves 15 and the second crown lateral grooves 16 are ensured, resulting in exerting better snow performance.

Preferably, the first crown lateral grooves 15 and the second crown lateral grooves 16, for example, extend obliquely to the tire axial direction. In this embodiment, the first crown lateral grooves 15 are inclined in the same direction as the second crown lateral grooves 16 with respect to the tire axial direction.

Angles θ1 of the first crown lateral grooves 15 to the tire axial direction and angles θ2 of the second crown lateral grooves 16 to the tire axial direction are preferably equal to or more than 10 degrees, more preferably equal to or more than 20 degrees, but preferably equal to or less than 60 degrees, more preferably equal to or less than 45 degrees, further preferably equal to or less than 30 degrees. The first crown lateral grooves 15 and the second crown lateral grooves 16 as such, upon driving on snow, may generate powerful snow shearing force in the tire circumferential and axial directions in a well-balanced manner.

Preferably, widths W5 of the first crown lateral grooves 15 and widths W6 of the second crown lateral grooves 16, for example, are in a range of from 2.2% to 6.7% of the tread width TW (see FIG. 1 and the same hereinafter). Preferably, depths d3 of the first crown lateral grooves 15 and depths d4 of the second crown lateral grooves 16, for example, are in a range of from 0.66 to 0.83 times the depth d1 of the crown main groove 3.

Figure 3:
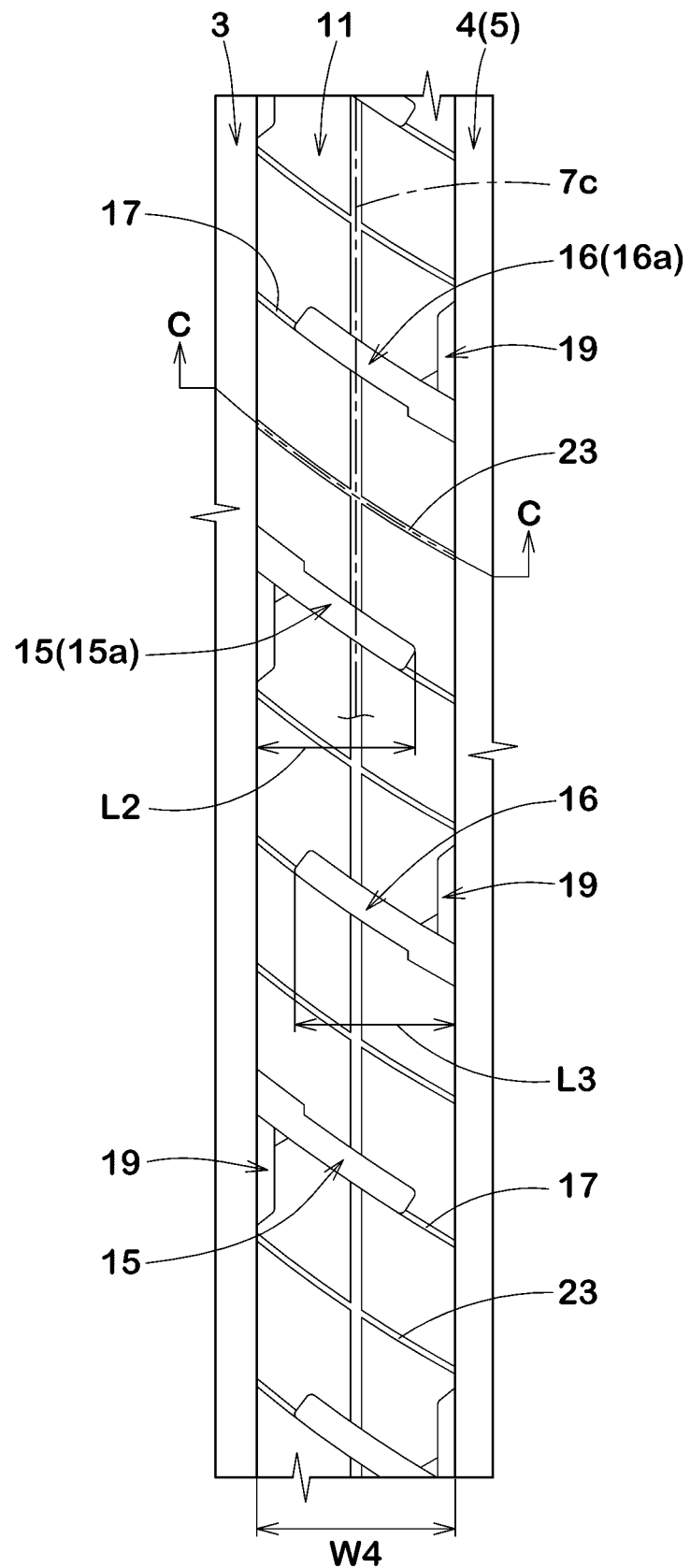
FIG. 3 is a partial enlarged view of FIG. 2 for illustrating one of the crown land portions on a side of an inboard tread edge.

FIG. 3 illustrates an enlarged view of the inboard crown land portion 11. As illustrates in FIG. 3, in the inboard crown land portion 11, the first crown lateral grooves 15a and the second crown lateral grooves 16a preferably extend beyond the axial center location 7c of the inboard crown land portion 11. Thus, sufficient lengths of the first crown lateral grooves 15a and the second crown lateral grooves 16a on the inboard crown land portion 11 on which relative high ground contact pressure acts are ensured, resulting in improving snow performance.

In order to improve steering stability on dry roads and snow performance in a well-balance manner, in the inboard crown land portion 11, axial lengths L2 of the first crown lateral grooves 15a and axial length L3 of the second crown lateral grooves 16a, for example, are preferably in a range of from 0.55 to 0.92 times the axial width W4 of the inboard crown land portion 11.

Figure 4:
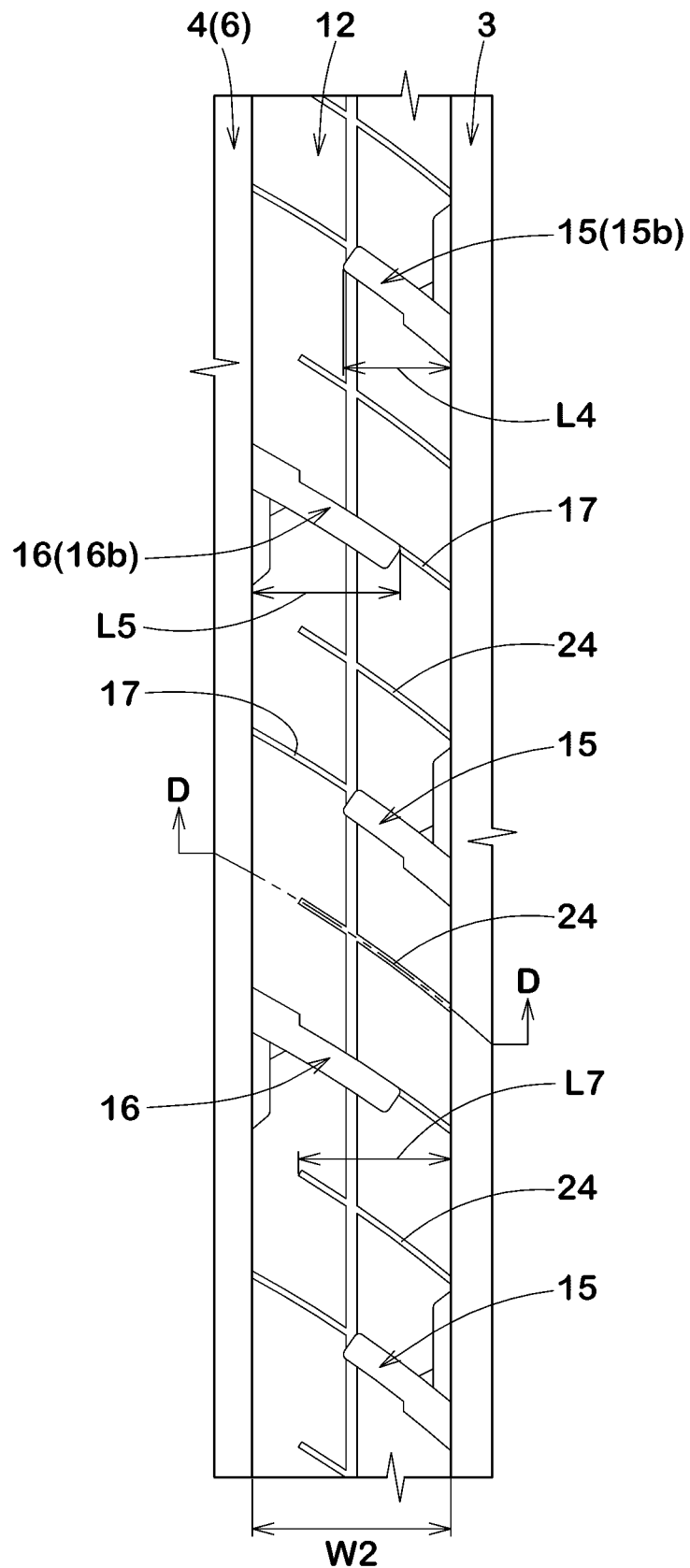
FIG. 4 is a partial enlarged view of FIG. 2 for illustrating the other one of the crown land portions on a side of an outboard tread edge.

FIG. 4 illustrates an enlarged view of the outboard crown land portion 12. As illustrates in FIG. 4, in the outboard crown land portion 12, the first crown lateral grooves 15b, for example, have axial lengths L4 of from 0.50 to 0.60 times the axial width W2 of the outboard crown land portion 12.

In the outboard crown land portion 12, the second crown lateral grooves 16b preferably have larger axial lengths L5 than the axial lengths L4 of first crown lateral grooves 15b. The lengths L5 of the second crown lateral grooves 16b, are preferably equal to or more than 1.25 times, more preferably equal to or more than 1.30 times, but preferably equal to or less than 1.45 times, more preferably equal to or less than 1.40 times the lengths L4 of the first crown lateral grooves 15b. According to such a configuration of the crown lateral grooves 15b and 16b, the outboard crown land portion 12 may have rigidity greater than that of the inboard crown land portion 11 to ensure steering stability on dry roads.

As illustrates in FIG. 2, in this embodiment, at least one of the inboard crown land portion 11 and the outboard crown land portion 12, preferably both portions are provided with connecting sipes 17, crown longitudinal sipes 18 and crown chamfered portion portions 19. As used herein, a "sipe" means a narrow cut or incision that has its width less than 2 mm.

The connecting sipes 17 each connect one of the first crown lateral grooves 15 and one shoulder main groove 4, or one of the second crown lateral grooves 16 and the crown main groove 3. In this embodiment, both types of connecting sipes 17 as mentioned above are provided. The connecting sipes 17, for example, are preferably inclined in the same direction as the first and second crown lateral grooves. In some preferred embodiments, each of the connecting sipes 17 extends to be continuous smoothly to one of groove edges of one first or second crown lateral groove so as to form a single groove edge together.

Figure 5A:
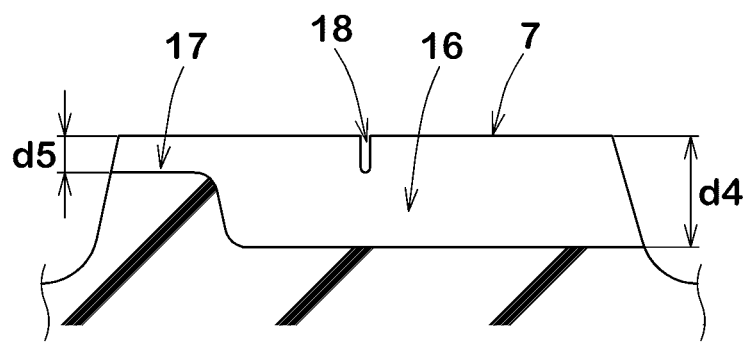
FIGS. 5A and 5B are respectively cross-sectional views taken along line A-A and line B-B of FIG. 2.

FIG. 5A illustrates a cross-sectional view of one connecting sipe 17 and one second crown lateral groove 16 taken along line A-A of FIG. 2, as a typical example. As illustrated in FIG. 5A, the connecting sipe 17 preferably has a depth d5 of from 0.30 to 0.50 times the depth d4 of the second crown lateral groove 16. The connecting sipe 17 as such may be useful to open the crown lateral grooves 15 and/or 16 suitably, resulting in suppressing clogging snow in the grooves upon driving on snow.

As illustrated in FIG. 2, the crown longitudinal sipes 18, for example, extend in the tire circumferential direction. In this embodiment, the crown longitudinal sipes 18 each extend in parallel with the tire circumferential direction so as to connect adjacent one first crown lateral groove 15 and one second crown lateral groove 16. The crown longitudinal sipes 18 as such may increase friction force in the tire axial direction, upon driving on wet and/or icy roads, due to its sipe edges.

In this embodiment, the crown longitudinal sipes 18, for example, are provided on a middle region of the crown land portions 7 in the tire axial direction. Specifically, axial distances L6 from the crown main groove 3 to the crown longitudinal sipe 18, for example, are in a range of from 0.4 to 0.6 times the axial width of the crown land portion.

In order to improve the above-mentioned effect while suppressing excessive reduction in rigidity of the crown land portions 11 and 12, the crown longitudinal sipes 18 preferably have depths d6 of from 0.15 to 0.45 times the depth d1 of the crown main groove 3.

Figure 5B:
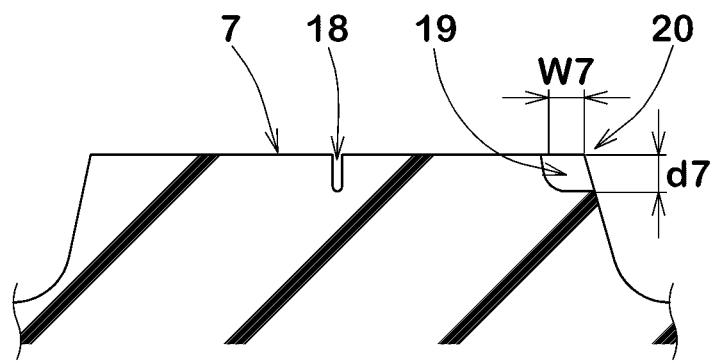

FIG. 5B illustrates a cross-sectional view of one crown chamfered portion 19 taken along line B-B of FIG. 2. As illustrated in FIG. 5B, the crown chamfered portion 19, for example, is a recessed portion in which a corner portion 20 between a ground contact surface of the land portion 7 and a sidewall is repressed. The crown chamfered portion 19 may be useful suppressing uneven wear of the crown land portion 7.

In order to further improve the above-mentioned effect, the crown chamfered portion 19 each preferably has an axial width W7 of from 1.0 to 3.0 mm. The crown chamfered portion 19, for example, may have a depth d7 of from 1.0 to 2.5 mm.

As illustrated in FIG. 2, the crown chamfered portion portions 19, for example, are arranged on acute-angle portions 21 of the corner portions 20 formed between the respective first crown lateral grooves 15 and the crown main groove 3, or between the respective second crown lateral grooves 16 and one shoulder main groove 4. In some preferred embodiment, the crown chamfered portion portions 19, for example, are arranged on the acute-angle land portions of the corner portions 20. The crown chamfered portion portions 19 can suppress uneven wear of the crown land portions further and can be useful that the first and second crown lateral grooves and main grooves together can form large snow columns on driving on snow roads.

As illustrated in FIG. 3, the inboard crown land portion 11 is provided with full-opened sipes 23. The full-opened sipes 23 traverse the inboard crown land portions 11 completely. In some preferred embodiments, the full-opened sipes 23 are arranged between adjacent one first crown lateral groove 15 and one second crown lateral groove 16. Thus, the full-opened sipes 23 and crown lateral grooves 15 or 16 are arranged alternately in the tire circumferential direction.

Preferably, the full-opened sipes 23, for example, are inclined with respect to the tire axial direction in the same direction as the first and second crown lateral grooves 15 and 16. In this embodiment, the full-opened sipes 23, for example, extend along the first and second crown lateral grooves 15 and 16. The full-opened sipes 23 as such can suppress uneven wear of the land portion.

Figure 6A:
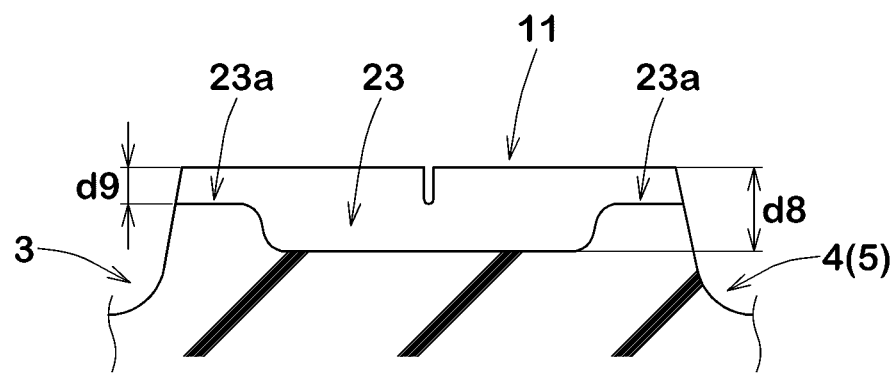
FIGS. 6A and 6B are respectively cross-sectional views taken along line C-C of FIG. 3 and line D-D of FIG. 4.

FIG. 6A illustrates a cross-sectional view of one full-opened sipe 23 taken along line C-C of FIG. 3. As illustrated in FIG. 6A, each of the full-opened sipes 23, for example, preferably has a maximum depth d8 of from 0.60 to 0.90 times the depths of the crown lateral grooves 15 and 16.

In this embodiment, the full-opened sipes 23, for example, each have axial both end portions 23a whose bottoms locally protrude radially upwardly. Preferably, the end portions 23a have depths d9 in a range of from 0.30 to 0.50 times the maximum depths d8. The full-opened sipes 23 can be useful to increase in rigidity of the land portion.

As illustrates in FIG. 4, in this embodiment, the outboard crown land portion 12 is provided with semi-opened sipes 24. The semi-opened sipes 24 extend from the crown main groove 3 toward the outboard tread edge To and terminate within the outboard crown land portion 12. In some preferred embodiments, the semi-opened sipes 24 each are provided between adjacent one first crown lateral groove 15 and one second crown lateral groove 16. Thus, the semi-opened sipes 24 and the first or second crown lateral grooves 15, 16 are arranged alternately in the tire circumferential direction.

Preferably, the semi-opened sipes 24, for example, are inclined with respect to the tire axial direction in the same direction as the first and second crown lateral grooves 15 and 16. In this embodiment, the semi-opened sipes 24, for example, extend along the first and second crown lateral grooves 15 and 16. The semi-opened sipes 24 as such can improve driving performance on wet and icy roads in association with the first and second crown lateral grooves 15 and 16.

In order to improve steering stability on dry roads and snow performance in a well-balance manner, the semi-opened sipes 24 preferably have axial lengths L7 in a range of from 0.70 to 0.85 times the axial width W2 of the outboard crown land portion 12.

Figure 6B:
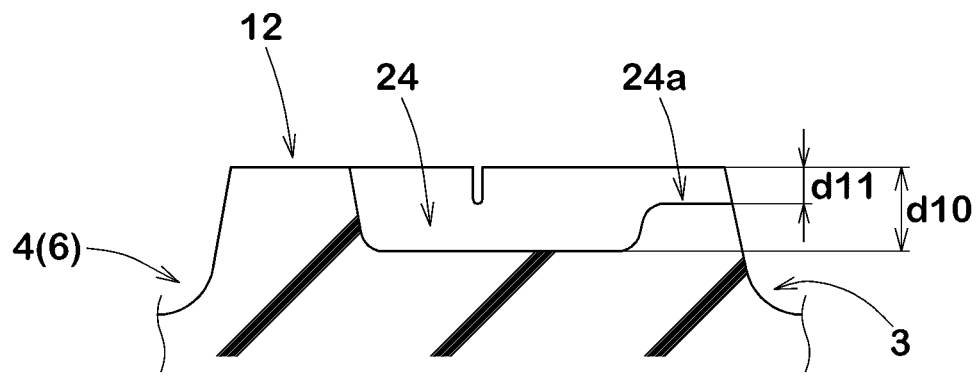

FIG. 6B illustrates a cross-sectional view of one semi-opened sipe 24 taken along line D-D of FIG. 4. As illustrated in FIG. 6B, the semi-opened sipes 24 preferably have maximum depths d10 of from 0.50 to 0.70 times the depths of the first and second crown lateral grooves 15 and 16.

In this embodiment, the semi-opened sipes 24, for example, each have one end portion 24a whose bottoms locally protrudes radially upwardly, wherein the one end portion 24a is located on the side of the crown main groove 3. The depth d11 of the end portion 24a, for example, is preferably of from 0.30 to 0.50 times the maximum depth d10 thereof. Thus, sufficient rigidity of the crown land portions 12 can be maintained, resulting in improving steering stability on dry roads and snow performance in a well-balanced manner.

Figure 7:
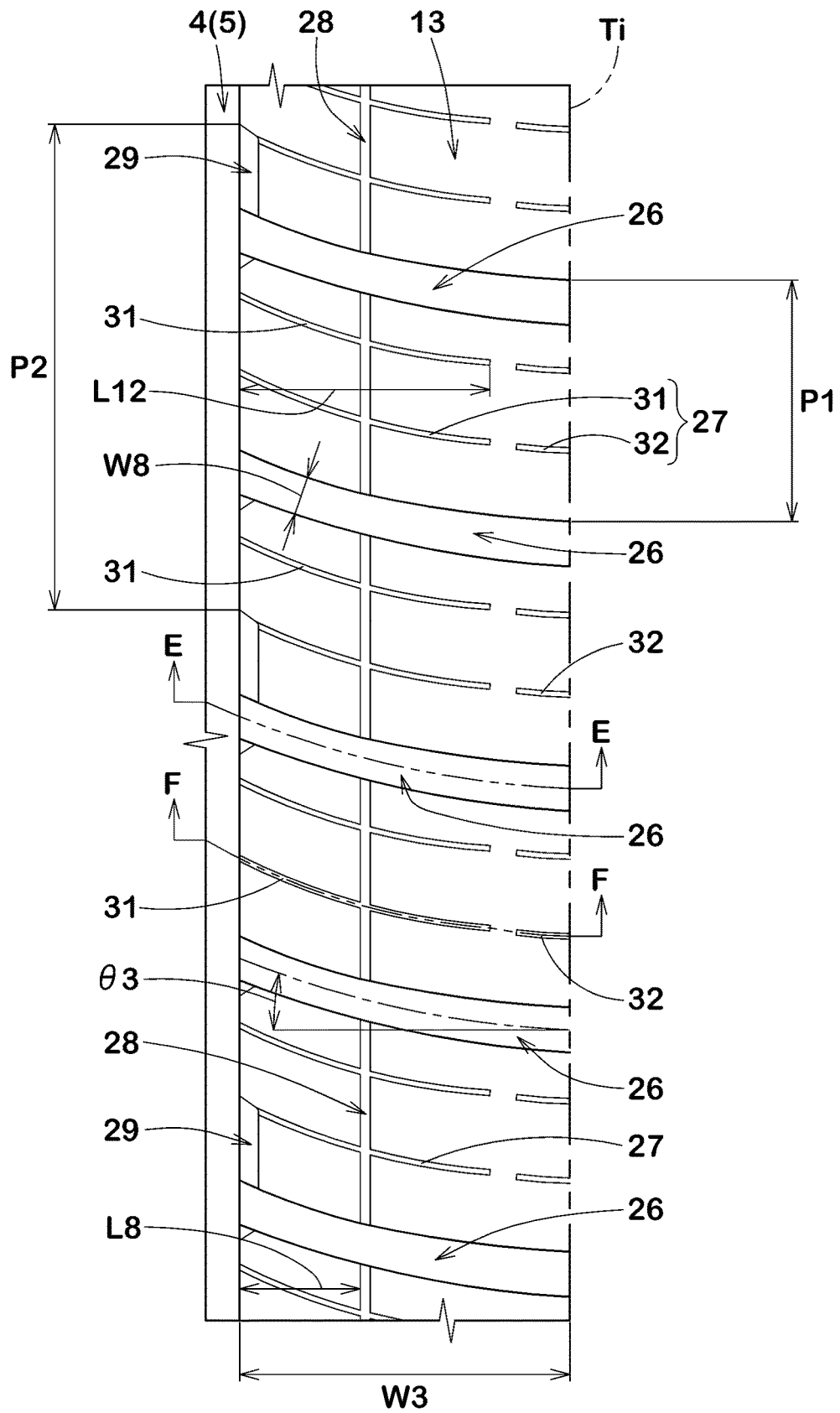
FIG. 7 is a partial enlarged view of an inboard shoulder land portion in FIG. 1.

FIG. 7 illustrates an enlarged view of the inboard shoulder land portion 13. As illustrates in FIG. 7, the inboard shoulder land portion 13 is provided with inboard shoulder lateral grooves 26, inboard shoulder sipes 27, inboard shoulder longitudinal sipes 28 and inboard shoulder chamfered portions 29.

The inboard shoulder lateral grooves 26 each connect the inboard tread edge Ti and the shoulder main groove 4 adjacent to the inboard tread edge Ti. Generally, tires are often used for vehicles with negative camber. Thus, since the inboard shoulder land portion 13 tends to receive relative large ground contact pressure, the inboard shoulder lateral grooves 26 which connect the inboard tread edge Ti and the shoulder main groove 4 can form firmly compressed snow column when driving on snow.

As illustrated in FIG. 1, preferably, the axially inner ends of the inboard shoulder lateral grooves 26 are located in different circumferential positions from the axially outer ends of the second crown lateral grooves 16 arranged on the inboard crown land portion 11. Thus, excessive opening of each grooves can be suppressed, leading to improve steering stability on dry roads.

As illustrated in FIG. 7, the inboard shoulder lateral grooves 26, for example, extend obliquely to the tire axial direction. In some preferred embodiments, the inboard shoulder lateral grooves 26 are inclined in the same direction as the first and second crown lateral grooves 15 and 16. The inboard shoulder lateral grooves 26 as such may generate snow shearing force in the same direction as the traction first and second crown lateral grooves 15 and 16.

Angles $\theta 3$ of the inboard shoulder lateral grooves 26 with respect to the tire axial direction are preferably smaller than the angles $\theta 1$ and $\theta 2$ of the first and second crown lateral grooves 15 and 16, respectively. Specifically, the angles $\theta 3$ are preferably equal to or more than 5 degrees, more preferably equal to or more than 10 degrees, but preferably equal to or less than 45 degrees, more preferably equal to or less than 30 degrees. The inboard shoulder lateral grooves 26 as such can generate powerful traction on snow in cooperation with the first and second crown lateral grooves 15 and 16.

In order to further improve the above-mentioned effect, in some preferred embodiments, the inboard shoulder lateral grooves 26 may be curved smoothly such that the angles $\theta 3$ increase gradually toward the tire equator C.

In order to improve steering stability on dry roads and snow performance in a well-balanced manner, groove widths W8 of the inboard shoulder lateral grooves 26 are preferably in a range of from 3.0% to 3.6% of the tread width TW.

Figure 8A:
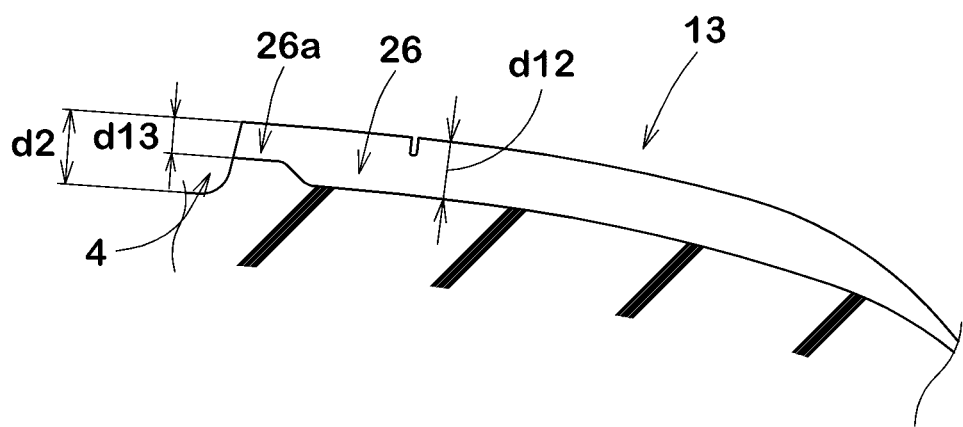
FIGS. 8A and 8B are respectively cross-sectional views taken along line E-E and line F-F of FIG. 7.

FIG. 8A illustrates a cross-sectional view of one inboard shoulder lateral groove 26 taken along line E-E of FIG. 7. As illustrates in FIG. 8A, the inboard shoulder lateral grooves 26 preferably have maximum depths d12 of from 0.73 to 0.83 times the depths d2 of the shoulder main groove 4 adjacent to the inboard tread edge Ti.

The inboard shoulder lateral grooves 26, for example, each have an axially inner end portion 26a whose bottom locally protrudes radially upwardly. Preferably, a depth d13 of the inner end portion 26a is of from 0.50 to 0.70 times the maximum depth d12 of the inboard shoulder lateral groove 26. Each inboard shoulder lateral groove 26 as such can be useful to maintain sufficient rigidity of the inboard shoulder land portion 13, resulting in improving steering stability on dry roads.

As illustrates in FIG. 7, one or more inboard shoulder sipes 27, for example, are arranged between circumferentially adjacent inboard shoulder lateral grooves 26. In this embodiment, a plurality of inboard shoulder sipes 27 is arranged between circumferentially adjacent inboard shoulder lateral grooves 26.

The inboard shoulder sipes 27, for example, include first inboard shoulder sipes 31 and second inboard shoulder sipes 32. The first inboard shoulder sipes 31, for example, each extend from the shoulder main groove 4 toward the inboard tread edge Ti and terminate within the inboard shoulder land portion 13. The second inboard shoulder sipes 32, for example, extend from at least the inboard tread edge Ti toward the shoulder main groove 4 and terminate short of the first inboard shoulder sipes 31. The first inboard shoulder sipes 31 and the second inboard shoulder sipes 32, for example, extend along the inboard shoulder lateral grooves 26. The inboard shoulder sipes 27 as such can improve wet performance and icy road performance while maintaining rigidity of the inboard shoulder land portion 13.

In order to further improve the above-mentioned effect, the first inboard shoulder sipes 31 preferably have axial lengths L12 of from 0.70 to 0.80 times the axial width W3 of the inboard shoulder land portion 13.

Figure 8B:
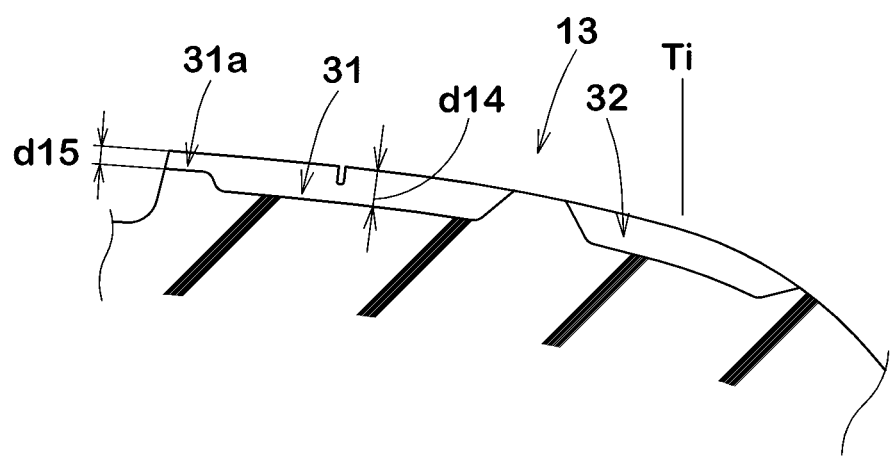

FIG. 8B illustrates a cross-sectional view of one first inboard shoulder sipe 31 and one second inboard shoulder sipe 32 taken along line F-F of FIG. 7. As illustrates in FIG. 8B, the first inboard shoulder sipes 31, for example, have axially inner end portions 31a whose bottoms protrude locally radially upwardly. Depths d15 of the inner end portions 31a, for example, are preferably of from 0.40 to 0.60 times the maximum depths d14 of the first inboard shoulder sipes 31. The first inboard shoulder sipes 31 as such, with the above mentioned inboard shoulder lateral grooves 26, can be useful to maintain sufficient rigidity of the inboard shoulder land portion 13, resulting in improving steering stability on dry roads.

In this embodiment, the second inboard shoulder sipes 32 preferably extend axially outwardly beyond the inboard tread edge Ti. The second inboard shoulder sipes 32 as such may be useful to deliver an excellent wandering resistance.

As illustrated in FIG. 7, the inboard shoulder longitudinal sipes 28 extend in the tire circumferential direction. In this embodiment, the inboard shoulder longitudinal sipes 28 each extend in parallel with the tire circumferential direction so as to connect adjacent inboard shoulder lateral grooves 26 with each other. The shoulder longitudinal sipes 28 as such can be useful to improve wet performance and ice performance.

In this embodiment, the inboard shoulder longitudinal sipes 28 are preferably arranged on a side of the tire equator C with respect to the axial center location of the inboard shoulder land portion 13. In some preferred embodiments, axial distances L8 from the shoulder main grooves 4 to the respective shoulder longitudinal sipes 28 are preferably greater than the axial distances L6 (shown in FIG. 2) from the crown main groove 3 to the respective crown longitudinal sipes 18. More specifically, the distances L8 are preferably in a range of from 3.5% to 15.0% of the tread width TW, for example.

The inboard shoulder longitudinal sipes 28 preferably have depths d16 in a range of from 0.15 to 0.45 times the depths d2 of the shoulder main grooves 3, for example. The shoulder longitudinal sipes 28 as such may promote the above-mentioned effect while maintaining rigidity of the inboard shoulder land portion 13.

The inboard shoulder chamfered portions 29, for example, have the same cross-sectional shape as the crown chamfered portions 19. By providing the inboard shoulder chamfered portions, the shoulder main groove 4 can form large snow columns when driving on snow, resulting in improving snow performance.

The inboard shoulder chamfered portions 29 each are provided on a region between adjacent one inboard shoulder lateral groove 26 and one first inboard shoulder sipe 31, for example. As illustrated in FIG. 1, in some preferred embodiments, the inboard shoulder chamfered portions 29 are arranged in different circumferential locations from the crown chamfered portions 19 which are arranged on axially outer corner portion of the inboard crown land portion 11. Thus, large snow columns can be formed by the shoulder main grooves 5, the inboard shoulder chamfered portions 29 and the crown chamfered portion 19 which are in cooperation with one another.

As illustrated in FIG. 7, the inboard shoulder chamfered portions 29, for example, are arranged at greater pitches P2 in the tire circumferential direction than that of the inboard shoulder lateral grooves 26. In this embodiment, the pitches P2 of the inboard shoulder chamfered portions 29, for example, are twice as long as the pitches P1 of the inboard shoulder lateral grooves 26. The inboard shoulder chamfered portions 29 as such can improve steering stability on dry roads and snow performance in a well-balanced manner.

Figure 9:
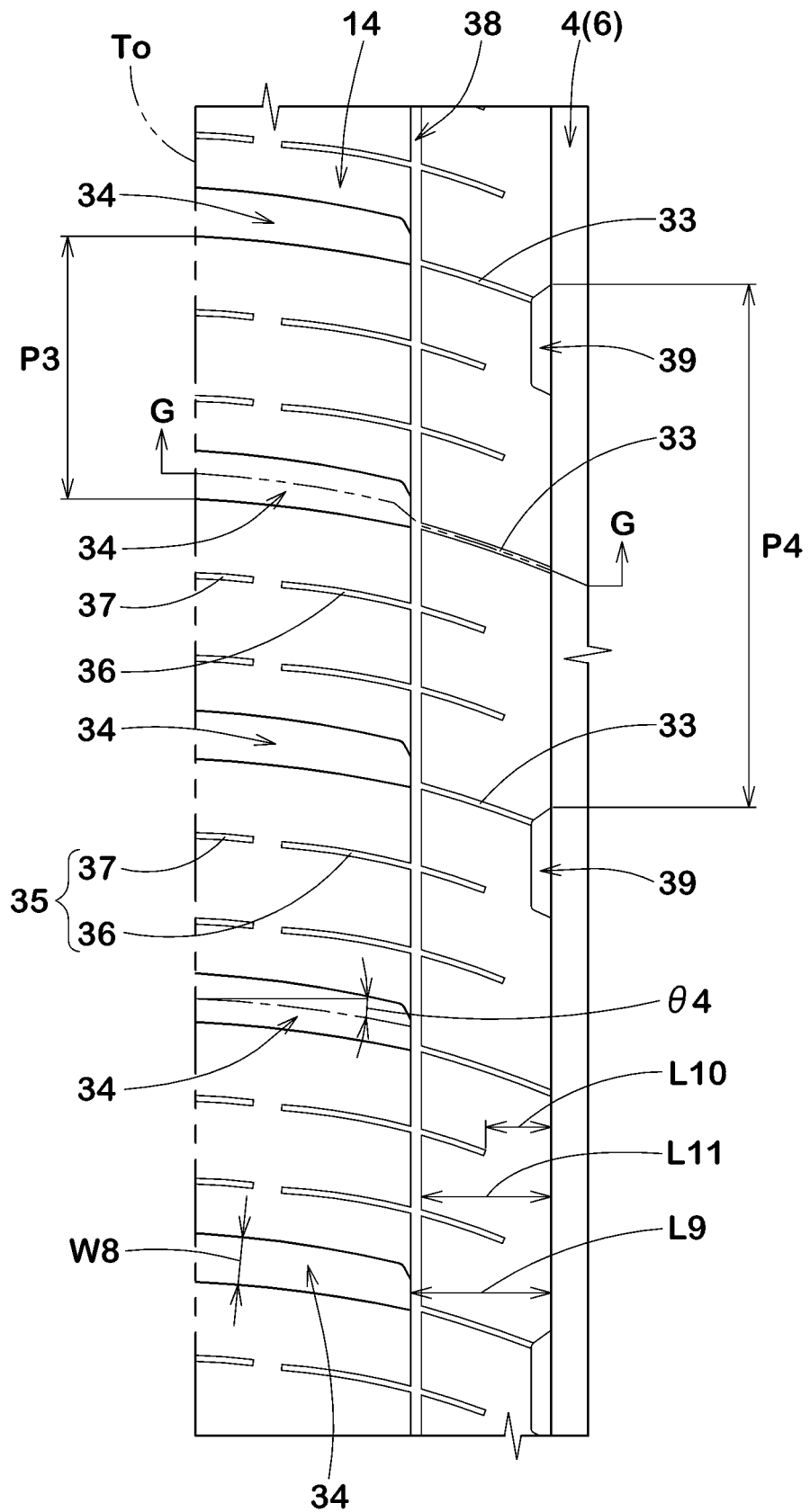
FIG. 9 is a partial enlarged view of FIG. 1 for illustrating an outboard shoulder land portion.

FIG. 9 illustrates an enlarged view of the outboard shoulder land portion 14. As illustrated in FIG. 9, the outboard shoulder land portion 14 in accordance with the embodiment, for example, is provided with outboard shoulder lateral grooves 34, shoulder connecting sipes 33, outboard shoulder sipes 35, an outboard shoulder longitudinal sipe 38 and outboard shoulder chamfered portions 39.

The outboard shoulder lateral grooves 34 each extend from the outboard tread edge To toward the tire equator C and terminate within the outboard shoulder land portion 14. The outboard shoulder lateral grooves 34 can improve wet performance and snow performance while maintaining rigidity of the outboard shoulder land portion 14.

Axial distances L9 from axially inner ends of the outboard shoulder lateral grooves 34 to the shoulder main groove 4, for example, are preferably in a range of from 3.0% to 3.6% of the tread width TW.

The outboard shoulder lateral grooves 34, for example, extend obliquely with respect to the tire axial direction. In some preferred embodiments, the outboard shoulder lateral grooves 34, for example, are inclined in the same direction as the first and second crown lateral grooves 15 and 16. Thus, the outboard shoulder lateral grooves 34, when driving on snow, can generate snow shearing force in the same direction as the first and second crown lateral grooves 15 and 16.

Angles θ4 of the outboard shoulder lateral grooves 34 with respect to the tire axial direction, for example, are preferably smaller than the angles θ1 and θ2 of the first and second crown lateral grooves 15 and 16, respectively. Specifically, the angles θ4 are preferably equal to or more than 5 degrees, more preferably equal to or more than 10 degrees, but preferably equal to or less than 45 degrees, more preferably equal to or less than 30 degrees. The outboard shoulder lateral grooves 34 can improve traction on snow roads.

In order to further improve the above-mentioned effect, in some preferred embodiments, the outboard shoulder lateral grooves 34 may be curved smoothly such that the angles θ4 increase gradually toward the tire equator C.

In order to improve steering stability on dry roads and snow performance in a well-balanced manner, groove widths W8 of the outboard shoulder lateral grooves 34 are preferably in a range of from 3.0% to 3.6% of the tread width TW, for example. Depths d17 of the outboard shoulder lateral grooves 34 are preferably of from 0.73 to 0.83 times the depths d2 of the shoulder main groove 4, for example.

The respective shoulder connecting sipes 33 connects the shoulder main groove 4 and the respective outboard shoulder lateral grooves 34. In this embodiment, each of the shoulder connecting sipes 33 extends to be continuous smoothly to one of groove edges of one outboard shoulder lateral groove 34 so as to form a single groove edge together. The shoulder connecting sipes 33 as such may be useful to open the outboard shoulder lateral grooves 34 suitably, resulting in suppressing clogging snow in the grooves upon driving on snow.

Figure 10:
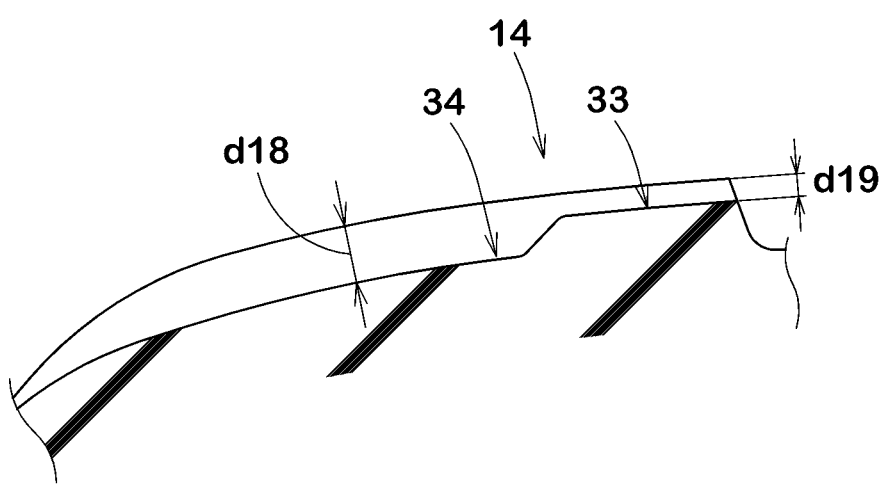
FIG. 10 is a cross-sectional view taken along line G-G of FIG. 9.

FIG. 10 illustrates a cross-sectional view of one outboard shoulder lateral groove 34 and one shoulder connecting sipe 33 taken along line G-G of FIG. 9. As illustrates in FIG. 10, each shoulder connecting sipe 33, for example, has a depth d19 of from 0.20 to 0.40 times the maximum depth d18 of the outboard shoulder lateral groove 34 to which the shoulder connecting sipe 33 connects. The shoulder connecting sipes 33 as such may be useful to deform the outboard shoulder lateral grooves 34 suitably, resulting in suppressing clogging snow in the grooves upon driving on snow.

As illustrated in FIG. 9, one or more outboard shoulder sipes 35, for example, are provided between circumferentially adjacent outboard shoulder lateral grooves 34. In this embodiment, a plurality of outboard shoulder sipes 35 is provided between circumferentially adjacent outboard shoulder lateral grooves 34. The outboard shoulder sipes 35 extend along the outboard shoulder lateral grooves 34.

The outboard shoulder sipes 35, for example, include first outboard shoulder sipes 36 and second outboard shoulder sipes 37. The first outboard shoulder sipes 36, for example, are configured as closed sipes which have both ends terminated within the outboard shoulder land portion 14. The second outboard shoulder sipes 37, for example, extend from at least the outboard tread edge To toward the shoulder main groove 4 and terminate short of the first outboard shoulder sipes 36. The outboard shoulder sipes 35 as such can improve wet performance and icy road performance while maintaining rigidity of the outboard shoulder land portion 14.

Preferably, axial maximum distances L10 from the shoulder main groove 5 to axially inner ends of the respective first outboard shoulder sipes 36 are in a range of from 2.0% to 7.0% of the tread width TW, for example.

The outboard shoulder longitudinal sipe 38 extends in the tire circumferential direction. In this embodiment, the outboard shoulder longitudinal sipe 38 extends in parallel with the tire circumferential direction so as to connect axially inner end portions of the outboard shoulder lateral grooves 34. The shoulder longitudinal sipes 38 as such may increase friction force in the tire axial direction, upon driving on wet and/or icy roads.

In this embodiment, the outboard shoulder longitudinal sipe 38 is arranged on the side of the tire equator C with respect to the axial center location of the outboard shoulder-land portion 14, for example. More specifically, an axial distance L11 from the shoulder main groove 4 to the shoulder longitudinal sipe 38 is preferably in a range of from 3.5% to 15.0% of the tread width TW, for example.

Preferably, the outboard shoulder longitudinal sipe 38, for example, has a depth d20 of from 0.15 to 0.45 times the depth d2 of the shoulder main groove 4 adjacent to the outboard shoulder land portion 14 in order to improve the above-mentioned effect while maintaining rigidity of the outboard shoulder land portion 14.

The outboard shoulder chamfered portions 39, for example, have the same cross-sectional shape as the crown chamfered portions 19. In this embodiment, the outboard shoulder chamfered portions 39 are arranged to communicate with one shoulder connecting sipe 33, for example. The outboard shoulder chamfered portions 39 as such may be useful to form a large snow column in cooperation with the shoulder main groove 4, resulting in improving snow performance when driving on snow roads.

As illustrated in FIG. 1, the outboard shoulder chamfered portions 39, for example, are arranged in different circumferential locations from the crown chamfered portions 19 which are arranged on an axially outer corner portion of the outboard crown land portion 12. In some preferred embodiments, each of the outboard shoulder chamfered portions 39 is preferably arranged so as to face an edge of the crown land portion 11 to which none of grooves and sipes are communicated. Thus, firmly compressed snow column may be formed between the outboard shoulder chamfered portions 39 and the crown land portion 11.

As illustrated in FIG. 9, the outboard shoulder chamfered portions 39, for example, are arranged at circumferential pitches P4 which is greater than circumferential pitches P3 of the outboard shoulder lateral grooves 34. In this embodiment, the pitches P4 of the outboard shoulder chamfered portions 39, for example, are twice as long as the pitches P3 of the outboard shoulder lateral grooves 34. The outboard shoulder chamfered portions 39 as such can improve steering stability on dry roads and snow performance in a well-balanced manner.

While the particularly preferable embodiments in accordance with the present invention have been described in detail, the present invention is not limited to the illustrated embodiments but can be modified and carried out in various aspects.

Example

Figure 11:
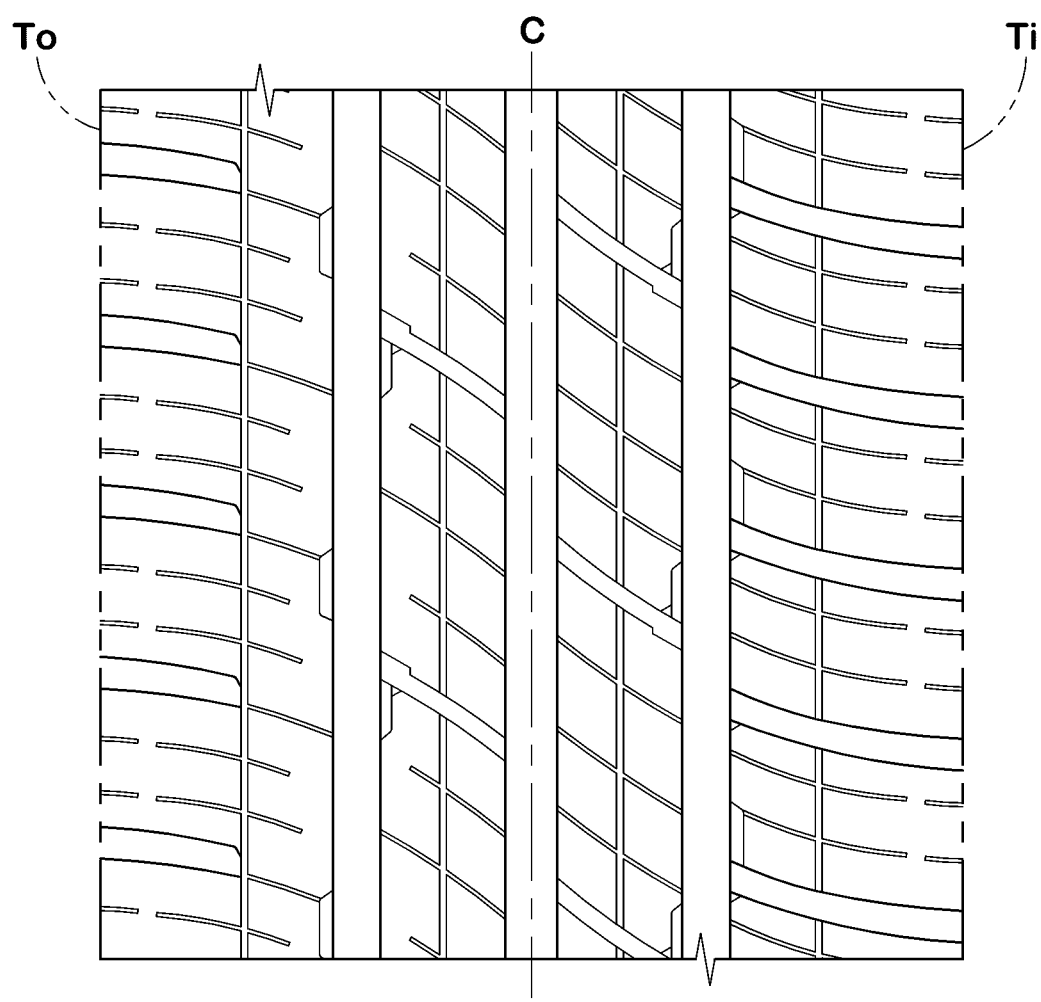
FIG. 11 is a development view of a tread portion of a tire in accordance with a comparative example.

Pneumatic tires 185/65R15 with a basic tread pattern as shown in FIG. 1 were manufactured by way of trial based on the specification in Table 1. A tire provided with lateral grooves which traverse completely the crown land portions was manufactured by way of trial as illustrated in FIG. 11, as a comparative example. Then, steering stability on dry roads and snow performance of each test tire was tested. The common specification and the testing method of the test tires are as follows.

Rim size: 15×6.0 J
Tire inner pressure (front/rear): 220 kPa/210 kPa
Test vehicle: front-drive vehicle with 1300 cc displacement
Tire location(s): all wheels
Test for Steering Stability on Dry Roads:

A test driver drove the test vehicle on a dry pavement road, and then evaluated steering stability of the vehicle by the driver's sense. The test results are shown in Table 1 by a point score system in which the comparative example is assumed to be 100. The larger numeric value indicates better steering stability on dry roads.

Test for Snow Performance:

A test driver drove the test vehicle on a snowy road, and then evaluated traction, braking and cornering performance by the driver's sense. The test results are shown in Table 1 by a point score system in which the comparative example is assumed to be 100. The larger numeric value indicates better snow performance.

Table 1 shows the test results.

TABLE 1

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Tread pattern | FIG. 11 | FIG. 1 | FIG. 1 | FIG. 1 | FIG. 1 | FIG. 1 | FIG. 1 | FIG. 1 | FIG. 1 |
| Axial width W1 of shoulder land portion/axial width W2 of crown land portion | 1.8 | 1.8 | 1.8 | 1.8 | 1.8 | 1.8 | 1.8 | 1.8 | 1.8 |
| Inboard first crown lateral groove lengths L2/inboard crown land portion width W4 | — | 0.80 | 0.55 | 0.65 | 0.85 | 0.90 | 0.80 | 0.80 | 0.80 |
| Inboard second crown lateral groove length L3/inboard crown land portion width W4 | — | 0.80 | 0.55 | 0.65 | 0.85 | 0.90 | 0.80 | 0.80 | 0.80 |
| Outboard first crown lateral groove lengths L4/outboard crown land portion width W2 | — | 0.53 | 0.53 | 0.53 | 0.53 | 0.53 | 0.60 | 0.70 | 0.75 |
| Outboard second crown lateral groove lengths L5/outboard crown land portion width W2 | — | 0.75 | 0.75 | 0.75 | 0.75 | 0.75 | 0.75 | 0.75 | 0.75 |
| Steering stability on dry roads (score) | 100 | 107 | 108 | 107 | 105 | 103 | 107 | 105 | 104 |
| Snow performance (score) | 100 | 104 | 102 | 103 | 105 | 106 | 104 | 105 | 105 |

|  | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|
| Tread pattern | FIG. 1 | FIG. 1 | FIG. 1 | FIG. 1 | FIG. 1 | FIG. 1 | FIG. 1 | FIG. 1 | FIG. 1 |
| Axial width W1 of shoulder land portion/axial width W2 of crown land portion | 1.8 | 1.8 | 1.8 | 1.8 | 1.8 | 0.8 | 1.0 | 2.0 | 2.2 |
| Inboard first crown lateral groove lengths L2/inboard crown land portion width W4 | 0.80 | 0.80 | 0.80 | 0.80 | 0.80 | 0.80 | 0.80 | 0.80 | 0.80 |
| Inboard second crown lateral groove length L3/inboard crown land portion width W4 | 0.80 | 0.80 | 0.80 | 0.80 | 0.80 | 0.80 | 0.80 | 0.80 | 0.80 |
| Outboard first crown lateral groove lengths L4/outboard crown land portion width W2 | 0.80 | 0.53 | 0.53 | 0.53 | 0.53 | 0.53 | 0.53 | 0.53 | 0.53 |
| Outboard second crown lateral groove lengths L5/outboard crown land portion width W2 | 0.75 | 0.65 | 0.70 | 0.80 | 0.85 | 0.75 | 0.75 | 0.75 | 0.75 |
| Steering stability on dry roads (score) | 103 | 107 | 107 | 106 | 104 | 103 | 105 | 107 | 107 |
| Snow performance (score) | 106 | 102 | 103 | 104 | 104 | 105 | 105 | 104 | 103 |

As a result of the tests, it was confirmed that the example tires according to the disclosure improve steering stability on dry roads and snow performance in a well-balanced manner.

What is claimed is:

1. A tire comprising:
   a tread portion having a designated mounting direction to a vehicle to define an outboard tread edge to be located on an outboard of a vehicle when the tire is mounted to the vehicle and an inboard tread edge to be located on an inboard of the vehicle when the tire is mounted to the vehicle, the tread portion being divided into four land portions by one circumferentially extending crown main groove and two circumferentially extending shoulder main grooves arranged one on each side of the crown main groove;
   the four land portions comprising two crown land portions disposed one on each side of the crown main groove;
   each of the crown land portions being provided with:
   first crown lateral grooves each extending from the crown main groove and terminating within the crown land portion;
   second crown lateral grooves each extending from the adjacent shoulder main groove and terminating within the crown land portion; and
   circumferentially extending crown longitudinal sipes, the crown longitudinal sipes extending in parallel with a tire circumferential direction, each crown longitudinal sipe connecting adjacent one first crown lateral groove and one second crown lateral groove, and the crown longitudinal sipes being arranged at a same location with respect to one another in a tire axial direction such that the crown longitudinal sipes form a single circumferential line, and the single circumferential line formed by the crown longitudinal sipes is straight,
   wherein in the crown land portion located on an inboard tread edge side, the first crown lateral grooves and the second crown lateral grooves extend beyond the crown longitudinal sipes, and
   wherein in the crown land portion located on an outboard tread edge side, the first crown lateral grooves terminate at the crown longitudinal sipes, and the second crown lateral grooves extend beyond the crown longitudinal sipes.

2. The tire according to claim 1, wherein
   in the crown land portion located on the side of the outboard tread edge, the second crown lateral grooves have larger axial lengths than the first crown lateral grooves.

3. The tire according to claim 1, wherein
   the at least one of the crown land portions is the crown land portion located on the side of the outboard tread edge, and
   the crown land portion located on the side of the outboard tread edge is provided with semi-opened sipes each extending from the crown main groove toward the outboard tread edge and terminating within the crown land portion.

4. The tire according to claim 3, wherein
the semi-opened sipes extend beyond the crown longitudinal sipes.

5. The tire according to claim 1, wherein
the tread portion has a designated mounting direction to a vehicle to define an outboard tread edge to be located on an outboard of a vehicle when the tire is mounted to the vehicle and an inboard tread edge to be located on an inboard of the vehicle when the tire is mounted to the vehicle,
the four land portions comprise an outboard shoulder land portion disposed axially outside the crown land portions on the side of the outboard tread edge and an inboard shoulder land portion disposed axially outside the crown land portions on the side of the inboard tread edge,
the inboard shoulder land portion is provided with inboard shoulder lateral grooves each connecting the inboard tread edge and one of the shoulder main grooves adjacent to the inboard shoulder land portion, each inboard shoulder lateral groove having a groove width in a range of 3.0% to 3.6% of a tread width over its entire length, and
the outboard shoulder land portion is provided with outboard shoulder lateral grooves each extending axially inwardly from the outboard tread edge and terminating within the outboard shoulder land portion.

6. The tire according to claim 5, wherein
the outboard shoulder land portion or the inboard shoulder land portion is provided with a circumferentially extending shoulder longitudinal sipe.

7. The tire according to claim 2, wherein
the crown land portion located on the side of the outboard tread edge is provided with semi-opened sipes each extending from the crown main groove toward the outboard tread edge and terminating within the crown land portion.

8. The tire according to claim 1, wherein
a connecting sipe connecting one of the first crown lateral grooves and the adjacent shoulder main groove, or one of the second crown lateral grooves and the crown main groove is provided on at least one of the crown land portions, and
the connecting sipe has a depth (d5) of from 0.30 to 0.50 times a depth (d4) of one first or second crown lateral groove to which the connecting sipe is connected.

9. The tire according to claim 1, wherein
on at least one of the crown land portions, a crown chamfered portion is provided on a corner portion between a ground contact surface of the at least one of the crown land portions and a sidewall thereof, and
the crown chamfered portion, in a plan view of the tread portion, is arranged on an acute-angle portion of the corner portion formed between one of the first crown lateral grooves and the crown main groove, or between one of the second crown lateral grooves and one of the shoulder main grooves.

10. The tire according to claim 9, wherein
the crown chamfered portion, in a plan view of the tread portion, is elongate in the tire circumferential direction with a constant width in the tire axial direction.

11. The tire according to claim 1, wherein
the crown longitudinal sipes have a width less than 2 mm, and
the crown longitudinal sipes have a depth of from 0.15 to 0.45 times a depth of the crown main groove.

12. The tire according to claim 1, wherein
axial distances from the crown main groove to the crown longitudinal sipes are in a range of 0.4 to 0.6 times an axial width of the at least one of the crown land portions.

13. The tire according to claim 1, wherein:
a length in the tire axial direction of the first crown lateral grooves provided on the crown land portion located on an inboard tread edge side is greater than a length in the tire axial direction of the first crown lateral grooves provided on the crown land portion located on an outboard tread edge side; or
a length in the tire axial direction of the second crown lateral grooves provided on the crown land portion located on an inboard tread edge side is greater than a length in the tire axial direction of the second crown lateral grooves provided on the crown land portion located on an outboard tread edge side.

14. The tire according to claim 1, wherein each of the first crown lateral grooves comprising:
a first groove edge extending in a longitudinal direction of the first crown lateral groove,
a second groove edge extending in a longitudinal direction of the first crown lateral groove, and
a terminal end edge connecting the first groove edge and the second groove edge at an end portion of the first crown lateral groove,
the first groove edge extending in an arch shape manner over an entire length thereof,
the second groove edge comprising a first portion extending from the crown main groove parallel to the first groove edge, a second portion extending from the terminal end edge toward the crown main groove parallel to the first groove edge, and a third portion connecting the first portion and the second portion in a step manner, and
the second portion being located nearer to the first groove edge than the first portion to form a narrower groove width with respect to a groove width formed between the first groove edge and the second groove edge.

15. A tire comprising:
a tread portion being divided into four land portions by one circumferentially extending crown main groove and two circumferentially extending shoulder main grooves arranged one on each side of the crown main groove;
the four land portions comprising two crown land portions disposed one on each side of the crown main groove;
each of the crown land portions being provided with first crown lateral grooves each extending from the crown main groove and terminating within the crown land portion and second crown lateral grooves each extending from the adjacent shoulder main groove and terminating within the crown land portion; and
in each of the crown land portion, the first crown lateral grooves and the second crown lateral grooves extending at least to an axial center location of the crown land portions,
wherein at least one of the crown land portions is provided with circumferentially extending crown longitudinal sipes, the crown longitudinal sipes extending in parallel with a tire circumferential direction, each crown longitudinal sipe connecting adjacent one first crown lateral groove and one second crown lateral groove, and the crown longitudinal sipes are arranged at a same location with respect to one another in a tire axial direction such that the crown longitudinal sipes form a single circumferential line, wherein the crown land portion located on the side of the outboard tread edge is provided with semi-opened sipes each extending from the crown main groove toward the outboard tread edge and terminating within the crown land portion, wherein the semi-opened sipes have axial lengths L7 in a range of from 0.70 to 0.85 times an axial width W2 of the crown land portion, and the semi-opened sipes extends beyond the crown longitudinal sipes, and wherein a length in the tire axial direction of the first crown lateral grooves provided on the crown land portion located on an inboard tread edge side is greater than a length in the tire axial direction of the first crown lateral grooves provided on the crown land portion located on an outboard tread edge side; or a length in the tire axial direction of the second crown lateral grooves provided on the crown land portion located on an inboard tread edge side is greater than a length in the tire axial direction of the second crown lateral grooves provided on the crown land portion located on an outboard tread edge side.

16. A tire comprising:

a tread portion being divided into four land portions by one circumferentially extending crown main groove and two circumferentially extending shoulder main grooves arranged one on each side of the crown main groove;

the four land portions comprising two crown land portions disposed one on each side of the crown main groove;

each of the crown land portions being provided with first crown lateral grooves each extending from the crown main groove and terminating within the crown land portion and second crown lateral grooves each extending from the adjacent shoulder main groove and terminating within the crown land portion; and in each of the crown land portion, the first crown lateral grooves and the second crown lateral grooves extending at least to an axial center location of the crown land portions, wherein at least one of the crown land portions is provided with circumferentially extending crown longitudinal sipes, the crown longitudinal sipes extending in parallel with a tire circumferential direction, each crown longitudinal sipe connecting adjacent one first crown lateral groove and one second crown lateral groove, and the crown longitudinal sipes are arranged at a same location with respect to one another in a tire axial direction such that the crown longitudinal sipes form a single circumferential line, the at least one of the crown land portions is the crown land portion located on the side of the outboard tread edge, the crown land portion located on the side of the outboard tread edge is provided with semi-opened sipes each extending from the crown main groove toward the outboard tread edge and terminating within the crown land portion, on at least one of the crown land portions, a crown chamfered portion is provided on a corner portion between a ground contact surface of the at least one of the crown land portions and a sidewall thereof, the crown chamfered portion, in a plan view of the tread portion, is elongate in the tire circumferential direction with a constant width in the tire axial direction, the chamfered portion terminates without reaching the semi-opened sipes, and each of the first crown lateral grooves comprising:
   a first groove edge extending in a longitudinal direction of the first crown lateral groove,
   a second groove edge extending in a longitudinal direction of the first crown lateral groove, and
   a terminal end edge connecting the first groove edge and the second groove edge at an end portion of the first crown lateral groove,
   the first groove edge extending in an arch shape manner over an entire length thereof,
   the second groove edge comprising a first portion extending from the crown main groove parallel to the first groove edge, a second portion extending from the terminal end edge toward the crown main groove parallel to the first groove edge, and a third portion connecting the first portion and the second portion in a step manner, and
   the second portion being located nearer to the first groove edge than the first portion to form a narrower groove width with respect to a groove width formed between the first groove edge and the second groove edge.

* * * * *